C. N. CARLSON.
PIPE HOLDING BAND.
APPLICATION FILED SEPT. 22, 1919.

1,381,279. Patented June 14, 1921.

INVENTOR
Chas. N. Carlson.
BY Geo. Stevens.
ATTORNEY.

UNITED STATES PATENT OFFICE.

CHARLES N. CARLSON, OF DULUTH, MINNESOTA.

PIPE-HOLDING BAND.

1,381,279.  Specification of Letters Patent.  Patented June 14, 1921.

Application filed September 22, 1919. Serial No. 325,323.

*To all whom it may concern:*

Be it known that I, CHARLES N. CARLSON, a citizen of the United States, residing at Duluth, in the county of St. Louis and State of Minnesota, have invented certain new and useful Improvements in Pipe-Holding Bands, of which the following is a specification, reference being had therein to the accompanying drawing.

This invention relates to pipe joints and has special reference to means for securely uniting two sections of stove pipe; though it may be applicable to other forms of pipe connections than the above.

I am aware that somewhat similar devices have been patented wherein an encircling band with pegs attached thereto has been employed, but one of the principal objects of my present invention is to provide means whereby such band may be used as a templet or marker for properly positioning the holes in the pipe sections for the pegs or studs in the band.

Other advantages of the peculiar construction will appear in the further description of the invention.

Referring to the accompanying drawings forming part of this application and in which like reference characters represent like parts:

Figure 1:
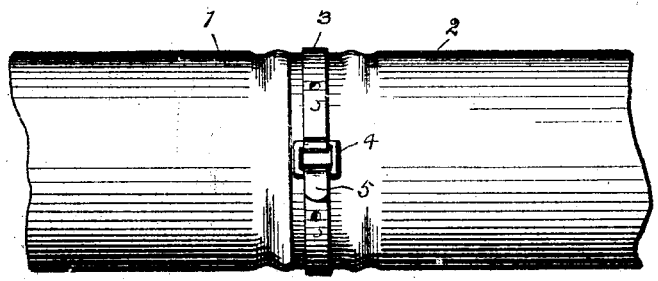
Figure 1 is a side elevation of the ends of two sections of pipe held together by my improved structure.
Figures 2, 3:
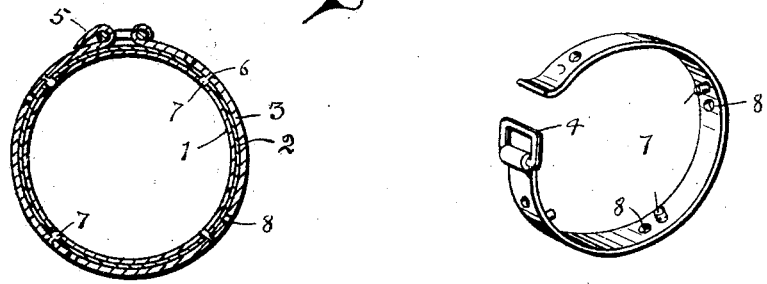
Fig. 2 is a transverse sectional view through the center of the band applied as illustrated in Fig. 1.
Fig. 3 is a perspective view of my improved securing band.
Figure 4:
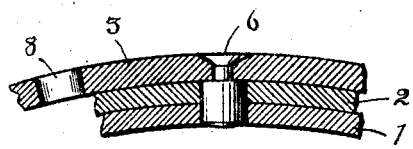
Fig. 4 is an enlarged sectional view through one of the holding pegs.

1 and 2 represent the two portions of stove pipe, the ends of which are united by being placed one within the other. A plurality of holes spaced equi-distant apart are formed through the walls of the pipe adjacent the ends thereof and are designed to register those in one section with those in the other when the two sections are united.

3 represents the encircling band which is made of flexible sheet metal having a link 4 attached to one end and the opposite end slightly tapered or flattened to readily fit within said link and to be bent backwardly upon itself when the band is in place about the pipes as shown at 5.

Within this band and rigidly fixed, as by flush riveting indicated at 6 are the normally inwardly projecting pegs or studs 7, such pegs being provided with suitable shoulders to prevent them being drawn through the band when riveted. After the ends of the pipes have been assembled with the holes therein registering, the band is placed about same with the pegs extending within the holes when the two ends of the band are securely united as above described.

Through the band 3 are formed four holes indicated at 8 they being spaced the same distance apart as the pegs in the band and which holes are used as markers for the ends of the pipe by passing the band thereabout with the pegs protruding outwardly. By this means accurate spacing of the holes for the reception of the pegs when the band is reversed and placed about the joined pipes is accomplished.

The holes may be formed in the pipe sections before they are united or after as desired, however with my improved form of band it becomes quite convenient to mark the position for the holes especially after the pipes are united, and punch through both sections simultaneously, and which may be accomplished by one not especially skilled in the art, as is evident.

To accomplish the above, the band is placed inside-out about the united ends of the pipe sections, the places for the holes in the pipe marked through the holes 8 in the band, when they are subsequently punched and the band put in position with the pegs 7 extending within the holes. By this means a positive and dependable hold-fast means for the ends of the pipe is provided and one that may be quickly and easily applied.

In thus uniting the ends of a horizontally disposed stove pipe it is essential that no hole occurs in the lowermost portion thereof, or which would normally be opposite the seam in the pipe, therefore two of the holes are spaced equi-distant from the lowermost central portion of the pipe, this being for the purpose of preventing leakage of creosote or ashes from the pipe, as is obvious.

Having thus described my invention what I claim and desire to secure by Letters Patent is:

1. The combination with a pipe-holding band of the character described having inwardly protruding pegs thereupon, of a series of holes in said band equal in number to the pegs therein and spaced the same distance apart as the pegs, for the purpose described.

2. The combination with a pipe-holding band of the character described, having a plurality of spaced normally inwardly projecting studs therein, flush riveted upon the opposite side of the band to that from which they project, of a plurality of holes within the band spaced equi-distance from the pegs therein substantially as and for the purpose described.

In testimony whereof I hereunto affix my signature in the presence of two witnesses.

CHARLES N. CARLSON.

Witnesses:
W. H. Denham,
S. Geo. Stevens.